(12) United States Patent
Williams et al.

(10) Patent No.: US 7,142,400 B1
(45) Date of Patent: Nov. 28, 2006

(54) METHOD AND APPARATUS FOR RECOVERY FROM POWER SUPPLY TRANSIENT STRESS CONDITIONS

(75) Inventors: Timothy J. Williams, Bellevue, WA (US); Michael K. Amundson, Woodinville, WA (US)

(73) Assignee: Cypress Semiconductor Corp., San Jose, CA (US)

( * ) Notice: Subject to any disclaimer, the term of this patent is extended or adjusted under 35 U.S.C. 154(b) by 0 days.

(21) Appl. No.: 10/107,687

(22) Filed: Mar. 27, 2002

(51) Int. Cl.
*H02H 3/22* (2006.01)
(52) U.S. Cl. .................................... 361/18; 361/111
(58) Field of Classification Search ............... 361/33, 361/18, 23, 91, 111, 56, 57, 90, 58, 110, 91.1, 361/21, 30
See application file for complete search history.

(56) References Cited

U.S. PATENT DOCUMENTS

| | | | |
|---|---|---|---|
| 4,099,068 A | 7/1978 | Kobayashi et al. ..... 307/200 A |
| 4,245,150 A | 1/1981 | Driscoll et al. .......... 235/92 FP |
| 4,367,422 A | 1/1983 | Leslie ........................ 307/597 |
| 4,367,423 A | 1/1983 | Hornung .................... 307/597 |
| 4,394,702 A | 7/1983 | Boothe ........................ 361/92 |
| 4,422,163 A | 12/1983 | Oldenkamp ................ 365/229 |
| 4,428,020 A | 1/1984 | Blanchard, Jr. ............. 361/90 |
| 4,429,236 A | 1/1984 | Nitschke .................... 307/362 |
| 4,433,390 A | 2/1984 | Carp et al. .................. 364/900 |
| 4,434,403 A | 2/1984 | Chang ........................ 328/120 |
| 4,473,459 A | 9/1984 | Bose et al. ............... 208/8 LE |
| 4,493,000 A | 1/1985 | Edwards ...................... 361/92 |
| 4,544,899 A * | 10/1985 | Townsend et al. ......... 333/17.1 |
| 4,581,552 A | 4/1986 | Womack et al. ............ 307/594 |
| 4,607,178 A | 8/1986 | Sugie et al. ................ 307/594 |
| 4,788,454 A | 11/1988 | Tanagawa et al. ...... 307/296 R |
| 4,788,462 A | 11/1988 | Vesce et al. ................ 307/597 |
| 4,879,623 A | 11/1989 | Baumgartner et al. ........ 361/33 |
| 4,902,910 A | 2/1990 | Hsieh ...................... 307/296.4 |
| 5,111,067 A | 5/1992 | Wong et al. ............. 307/272.3 |
| 5,207,006 A | 5/1993 | Sharpe et al. ................. 33/573 |
| 5,210,527 A * | 5/1993 | Smith et al. ................ 340/659 |
| 5,256,914 A | 10/1993 | Boomer ........................ 326/29 |
| 5,280,108 A | 1/1994 | Fanning .................... 530/387.7 |
| 5,313,112 A | 5/1994 | Macks ..................... 307/296.3 |
| 5,341,268 A * | 8/1994 | Ishiguro et al. .............. 361/62 |
| 5,457,414 A | 10/1995 | Inglis et al. ................... 327/77 |
| 5,543,741 A | 8/1996 | Purits ......................... 327/143 |
| 5,723,958 A * | 3/1998 | Boll et al. .................. 318/432 |
| 5,758,053 A * | 5/1998 | Takeuchi et al. .............. 714/4 |
| 6,025,985 A * | 2/2000 | Leytes et al. ................ 361/679 |
| 6,035,357 A * | 3/2000 | Sakaki ........................ 710/301 |
| 6,112,136 A | 8/2000 | Paul et al. .................. 700/293 |
| 6,118,622 A | 9/2000 | Gill ............................. 360/66 |
| 6,259,371 B1 * | 7/2001 | Chang ........................ 340/659 |
| 6,369,427 B1 * | 4/2002 | Williamson ................. 257/355 |
| RE37,738 E * | 6/2002 | Brkovic ....................... 323/222 |
| 6,411,544 B1 * | 6/2002 | Devin .................... 365/185.01 |
| 6,438,462 B1 * | 8/2002 | Hanf et al. ................. 700/297 |

(Continued)

OTHER PUBLICATIONS

IBM Technical Disclosure Bulletin, Aug. 1987.*

(Continued)

*Primary Examiner*—Brian Sircus
*Assistant Examiner*—Danny Nguyen
(74) *Attorney, Agent, or Firm*—Christopher P. Maiorana, PC (57) ABSTRACT

A method for recovery from overstress conditions, comprising the steps of (A) detecting an overstress event, (B) storing an occurrence of the overstress event and (C) taking appropriate action in response to the stored occurrence of the overstress event.

29 Claims, 5 Drawing Sheets

U.S. PATENT DOCUMENTS 6,441,675 B1 * 8/2002 Dishongh et al. ............ 327/525
6,658,597 B1 * 12/2003 Ker et al. ..................... 714/23
6,819,539 B1 * 11/2004 Wright et al. ................. 361/90

OTHER PUBLICATIONS

"A Quick Response Peak Detector for Variable Frequency Three-Phase Sinusoidal Signals", By Ching-Tsai Pan et al., IEEE Transactions on Industrial Electronics, vol. 41, No. 4, Aug. 1994, pp. 434-440.

"Design Consideration for Low-Voltage On-Board DC/DC Modules for Next Generations of Data Processing Circuits", By Michael T. Zhang et al., IEEE Transactions on Power Electronics, vol. 11, No. 2, Mar. 1996, pp. 328-337.

"Analog Fault Diagnosis Based on Ramping Power Supplying Current Signatures Clusters", By Shyam S. Somayajula et al., IEEE Transactions on Circuits and Systems—II: Analog and Digital Signal Processing, vol. 43, No. 10, Oct. 1996, pp. 703-712.

"Design Strategies and Decoupling Techniques for Reducing the Effects of Electrical Interference in Mixed-Mode IC's", By Mark Ingels et al., IEEE Journal of Solid-State Circuits, vol. 32, No. 7, Jul. 1997, pp. 1136-1141.

"Active Feedback Circuit for Minimization of Voltage Transients During Pulsed Measurements of Semiconductor Devices", By Albert M. Young et al., IEEE Transactions on Instrumentation and Measurement, vol. 50, No. 1, Feb. 2001, pp. 72-76.

"Low-Voltage Power System Surge Overvoltage Protection", By Dev. Paul, IEEE Transactions on Industry Applications, vol. 37, No. 1, Jan./Feb. 2001, pp. 223-229.

* cited by examiner

METHOD AND APPARATUS FOR RECOVERY FROM POWER SUPPLY TRANSIENT STRESS CONDITIONS

CROSS REFERENCE TO RELATED APPLICATIONS

The present application may relate to co-pending application Ser. No. 09/933,254, filed Aug. 20, 2001, which is hereby incorporated by reference in its entirety.

FIELD OF THE INVENTION

The present invention relates to a method and/or architecture for recovery from circuit stress conditions generally and, more particularly, to a method and/or architecture for implementing microcontrollers and systems that execute firmware with recovery from circuit stress conditions.

BACKGROUND OF THE INVENTION

Current approaches to robust operation in the presence of severe environmental stresses include specifying high immunity levels, additional filtering/suppression devices and watchdog timers.

High electrostatic discharge (ESD) immunity levels are typically specified for all parts. However, the ESD immunity levels do not provide robust operation in the presence of all stress conditions. Additionally, no standard immunity test for electrical test transient/burst (EFTB) (or similar) events exists, since the events depend on particular device implementation. The addition of extra devices to increase immunity (i.e., add bypass capacitance to relevant signals) has the disadvantage of extra cost and space penalties.

Watchdog reset circuits (i.e., to reset a device that has left normal operating mode) allow recovery from a known fault condition caused by overstress events. Watchdog reset circuits are most effective in cases of significant failure that places the device in a recognized fault mode (i.e., program code may be vectored to an illegal location, which causes code execution to halt until the watchdog reset occurs).

However, many cases exist where a stress condition causes faulty operation that is not recognizable by the watchdog reset circuit. EFTB testing shows many instances where a device stops operating properly but fails to trip the watchdog reset. In one example, the device may vector to an unintended part of code, resulting in faulty operation even though the device continues to operate within legal portions of the code. In another example, corruption of memory (i.e., RAM) can occur during an event, but go undetected and cause failure at a later time. The watchdog reset circuit is unable to detect when such problems occur.

Specifying immunity levels (i.e., 2 kV ESD) for recovery of stress conditions of devices increases cost and does not prevent all stress condition related problems. Adding (off-chip) filtering/suppression devices increases cost and has related space concerns. Additionally, watchdog timer circuits can enter confused modes that will not trip the watchdog circuit.

It is generally desirable to provide proper circuit operation during and/or after stress events (i.e., ESD, noise transients, etc.)

SUMMARY OF THE INVENTION

The present invention concerns a method for recovery from overstress conditions, comprising the steps of (A) detecting an overstress event, (B) storing an occurrence of the overstress event and (C) taking appropriate action in response to the stored occurrence of the overstress event.

The objects, features and advantages of the present invention include providing a method and/or architecture for implementing microcontrollers and systems that execute firmware with recovery from circuit stress conditions that may (i) detect and store power line transient stress event occurrences, (ii) trim detection sensitivity level on a device-by-device basis, and/or (iii) monitor stress events and implement appropriate action.

BRIEF DESCRIPTION OF THE DRAWINGS

These and other objects, features and advantages of the present invention will be apparent from the following detailed description and the appended claims and drawings in which:

FIGS. 1(a–b) are flowcharts illustrating a preferred embodiment of the present invention;

DETAILED DESCRIPTION OF THE PREFERRED EMBODIMENTS

Figure 1A:
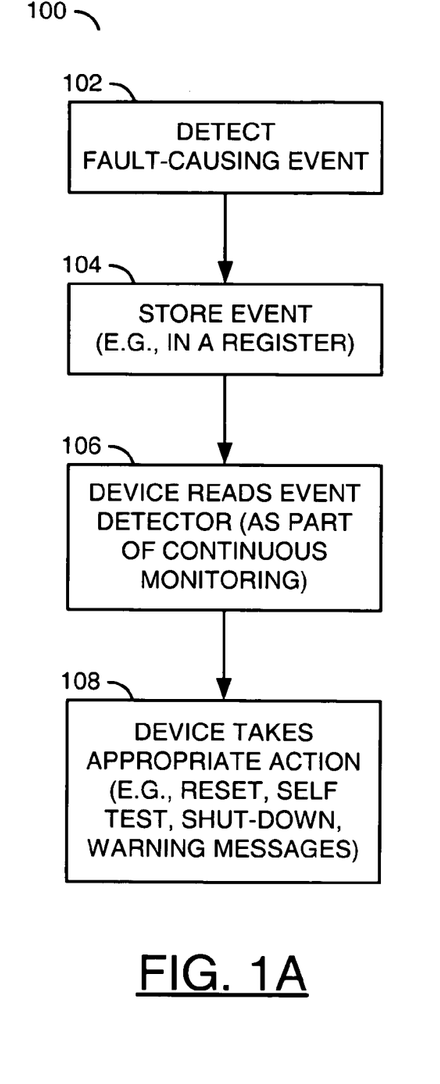

Referring to FIG. 1a, a block diagram of a process 100 is shown in accordance with a preferred embodiment of the present invention. The process 100 may be configured to recover from circuit stress conditions that typically cause a device to stop operating properly. In particular, the process 100 may be applicable to microcontrollers and systems that execute firmware. However, the process 100 may be applicable to any other appropriate devices to meet the design criteria of a particular application. Such stress conditions may include those covered by industry standard tests for electrostatic discharge (ESD), electrical fast transient/burst (EFTB), radiated Electromagnetic Interference (EMI), and operation in severe environments, where significant noise coupling may occur and upset the operation of the electronic device. In one example, the process 100 may provide a method and/or apparatus for recovery from power supply transient stress conditions. However, the process (or method, routine, etc.) 100 may be implemented to provide a method and/or architecture for recovery from any appropriate stress condition to meet the design criteria of a particular application.

FIG. 1a illustrates the process 100 comprising a state 102, a state 104, a state 106 and a state 108. While in the state 102, the process 100 may detect fault causing conditions (e.g., a fault causing event may occur). The process 100 may then continue to the state 104. While in the state 104, the process 100 may store the event. In one example, the event may be stored in a register (not shown). However, the process 100 may be configured to implement any appropriate storage to meet the design criteria of a particular application.

The process 100 may then proceed to the state 106. While in the state 106, the process 100 may read an event detector (e.g., an event table, an event register, etc.) to determine a type of event. The process 100 may be configured to read the event detector (or table) as part of a continuous monitoring process. The process 100 may then continue to the state 108. While in the state 108, the process 100 may take appropriate action (e.g., a particular action in response to a particular event type). In one example, (e.g., a critical case), the process 100 may be configured to provide a quick and complete reset in response to one or more stress events. In another example, (e.g., a non-critical case), the method 100 may be configured to implement self checking, issue warnings, perform back-up operations, shut-down, and/or other appropriate recovery steps prior to or instead of a full reset in response to one or more stress events.

The process 100 may detect (e.g., the state 102) and store (e.g., the state 104) the occurrence of an overstress condition (e.g., an event). The process 100 may be configured to detect events that cause faulty operation and may otherwise go undetected. The process 100 may then provide fault operation recovery. The process 100 may be configured to detect and recover from stress events as well as provide fault operation detection. For example, the process 100 may detect an overstress event and store the fault causing event occurrence for later action. The fault causing event may then be recognized (e.g., the state 106) and appropriate action may be taken for device recovery (e.g., the state 108). The appropriate recovery action may be implemented at one or more later times (delays) in response to the respective events.

Figure 1B:
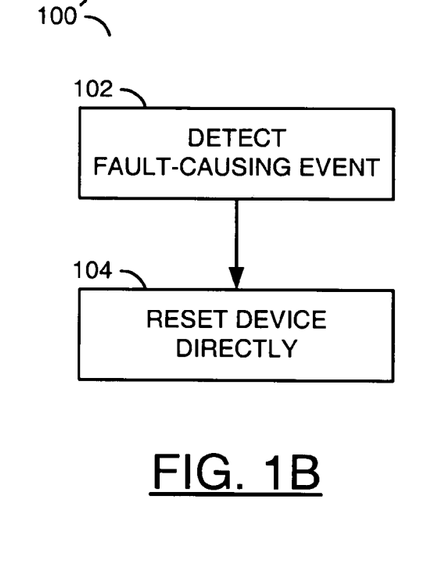

FIG. 1b illustrates process 100' in accordance with an alternate embodiment of the present invention. The process 100' may be implemented similarly to the process 100. While in the state 102, the process 100' may detect a fault causing event. The process 100' may then proceed to a state 110. While in the state 110, the process 100' may perform a direct device reset. The process 100' may be less flexible than the process 100. However, the process 100' may be applicable when monitoring for fault conditions is not available (e.g., no system processor). The process 100' may also be applicable when a device reset is generally implemented in response to the particular fault conditions (e.g., other prior responses are not needed). However, the process 100' may be implemented in any appropriate circumstances to meet the design criteria of a particular application.

The process 100 (or 100') may be directed to detecting stress events that cause a fast transient pulse on power supply lines. Fast transient pulses on power supply lines may be caused by any of the events and/or tests listed previously (e.g., ESD and/or EFTB tests, radiated EMI, etc.). Fast transient pulses on power supply lines may commonly occur during an EFTB test such as IEC 1000-4-4 (commonly performed by manufacturers of computer mice, keyboards, joysticks, etc.). During EFTB tests, a large transient voltage is applied to the system either through a cable coupled to the device or through a power connection. The cable generally contains power lines and data lines. At high stress levels, the EFTB tests may cause a functional device failure not typically detected by low voltage reset or watchdog time-out reset devices. Therefore, the system under test is unable to detect that the device has stopped functioning properly. In conventional systems a re-boot or device unplug/re-plug is needed to recover proper operation of the device. The process 100 (or 100') may be configured to provide a method and/or architecture to detect that a possibly hazardous event has occurred and take appropriate action as necessary.

A power supply transient may not always lead to device failure, but may indicate the presence of a disturbance likely to cause future failure. In this case, detecting and responding to the supply transient (e.g., via the process 100) may be sufficient for robust recovery from a fault.

The process 100 may be configured to implement a robust recovery from supply voltage transient stress problems via detecting and storing the occurrence of such a condition. Therefore, events that may cause faulty operation but go undetected by other protection schemes are generally detected via the method 100, allowing for appropriate recovery. In one example, the process 100 may be configured to detect and recover from power supply transient events. However, the method 100 may be configured to detect any appropriate event and/or implement any appropriate storage and/or recovery to meet the design criteria of a particular application.

The process 100 may be configured to detect an overstress event that is recognized via a transient on one or more power supply lines. The process 100 may be configured to either store such an occurrence for later action (the states 104–108) or reset the device directly (the state 110). Therefore, a potential fault causing event may be recognized and appropriate action taken for device recovery via the process 100. The precise causes of failures accompanying and/or caused by a power supply transient stress event may be difficult to anticipate and/or measure. Furthermore, power supply transient stress events may generate a variety of possible failure causing events in a device. The process 100 may bypass such failure causing events by storing (or registering) the occurrence (or presence) of the event and implementing an appropriate recovery.

Figure 2:
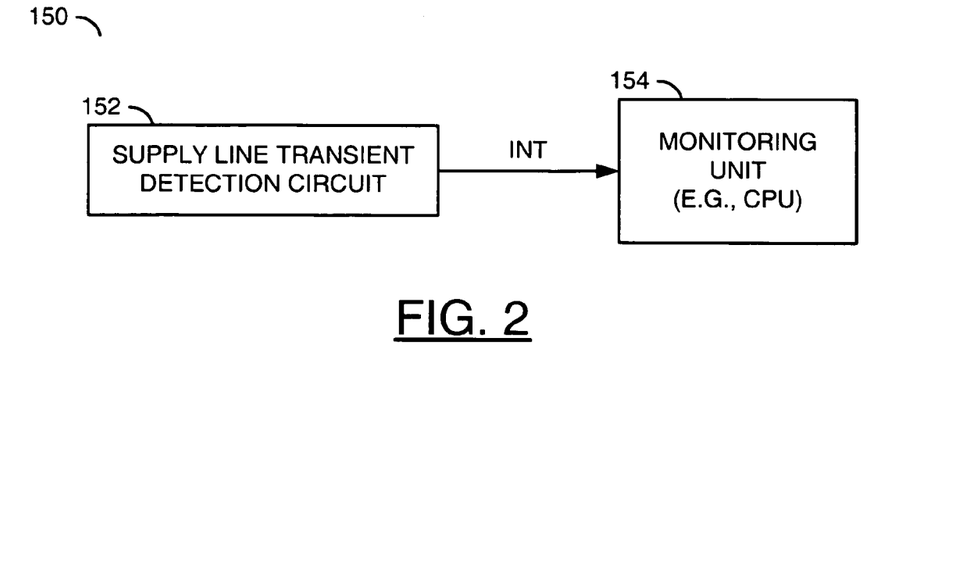
FIG. 2 is a block diagram of an example implementation of the present invention.

Referring to FIG. 2, the process 100 implemented within a device 150 is shown. The circuit 150 may be implemented as a microcontroller. The microcontroller 150 generally comprises a detect block (or circuit) 152 and a monitoring unit 154. In one example, the detector 152 may be implemented as a supply line transient detection circuit. However, the circuit 152 may be implemented as any appropriate detect circuit to meet the design criteria of a particular application. In one example, the monitoring unit 154 may be implemented as a central processing unit (CPU). However, the circuit 154 may be implemented as any appropriate monitor circuit to meet the design criteria of a particular application. The controller 154 may be configured to poll the event detector 152 to determine if an event has occurred. The controller 154 may also be configured to receive an alert that is presented by the detect circuit 152 via an interrupt signal (e.g., INT) whenever an event occurs. The processor 154 may then take appropriate recovery action in response to the detector 152 (e.g., the signal INT).

Figure 3:
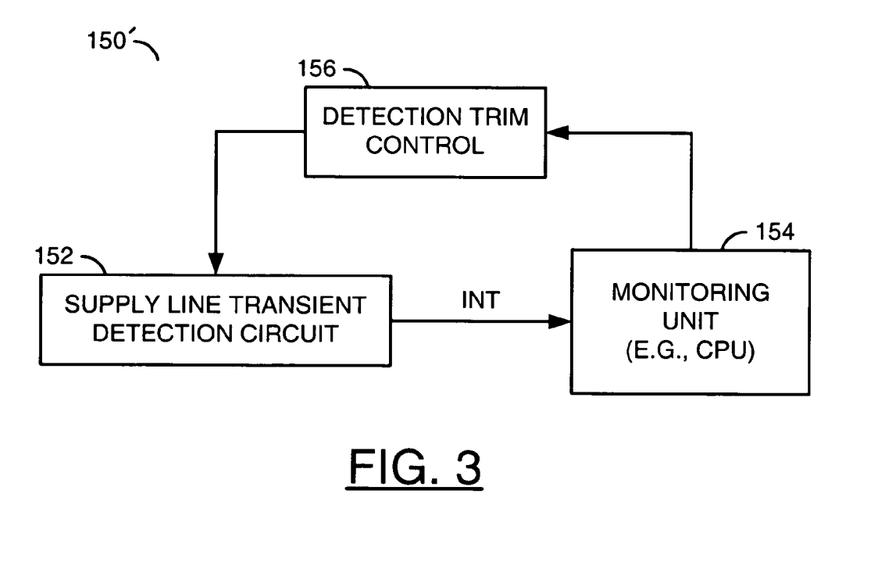
FIG. 3 is a block diagram of an alternate implementation of the circuit of FIG. 2.

Referring to FIG. 3, an alternate embodiment of the microcontroller 150 is shown, marked with primed notation. The circuit 150' may be implemented similarly to the circuit 150. The microcontroller 150' may additionally comprise a trim control block (or circuit) 156. The microcontroller 150' may allow the detection sensitivity to be tuned to meet the design criteria of a particular application. The controller 156 may be configured to select or "trim" the detector 152 in response to one or more predetermined and/or adjustable criteria. The user may select the desired detection sensitivity criteria based on device characteristics, intended operating environment, empirical measurements, and/or any other appropriate criteria. The detection circuit 152 may be configured to operate at a number of levels of detection sensitivity.

Figure 4:
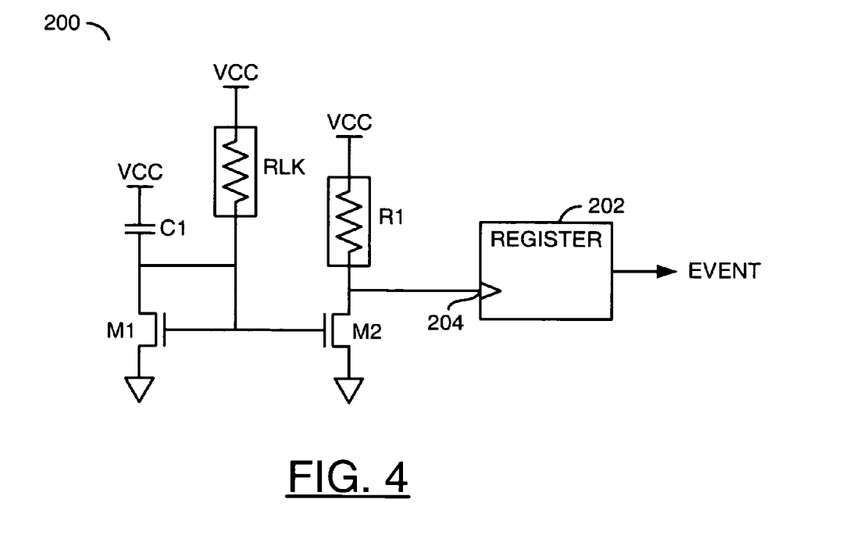
FIG. 4 is a block diagram of a positive supply transient detector implemented in connection with the present invention.

Referring to FIG. 4, a circuit 200 for detecting a positive power supply transient (e.g., a transient that generally causes the voltage between supply rails to increase) is shown. A power supply (not shown) may be configured to settle back to near its original value after the occurrence of stress events. However, the circuit 200 is generally configured to function properly regardless of the state of the power supply.

The circuit 200 generally comprises a capacitor (e.g., C1), a resistor (e.g., RLK), a resistor (e.g., R1), a device (e.g., M1), a device (e.g., M2) and a register 202. In one example, the devices M1 and M2 may be implemented as NMOS type devices. However, the devices M1 and/or M2 may be implemented as any appropriate device to meet the design criteria of a particular application. The NMOS devices M1 and M2 may be configured as a current mirror, with the device M2 mirroring the current in the device M1 (or a multiple of the current through the device M1). The device M1 may be biased through the leakage device RLK to be off or barely-on. The resistor RLK may be implemented as a large value resistor, reverse-biased diode, transistor configured to pass a small current or other appropriate device. Typical leakage values may be in the range of 1 nA to 10 uA, although other appropriate values may be implemented to meet the design criteria of a particular application. In some example implementations of the circuit 200, the device RLK may be deleted. The gate voltage of the device M1 may be at ground during periods when no power supply transients are occurring.

The device M2 may be configured to mirror the small leakage current through the pull-up device R1. The device R1 may be implemented as a resistor, transistor or other appropriate device configured to provide a sufficient voltage drop when a target current is active. When a positive supply transient occurs (e.g., the voltage between VCC and ground increases), the device C1 may pull the gate of the device M1 up, turning the device M1 on (or increasing the current passed by the device M1) and causing a current (or increased current) to flow through the device C1 and the device M1.

The transient current may be mirrored by the device M2. If the current is sufficiently large the device M2 may cause enough voltage drop across the device R1 to trip the register 202 via an input 204. The register 202 may therefore store the event (e.g., transient). The register 202 may be implemented as a D flip-flop, RS flip-flop, latch, or other appropriate storage device. The register 202 may also be read and/or reset by the system 200 during an appropriate state of the process 100. The register 202 may be configured to change state when a sufficiently large pulse is presented to the input 204. The size of the pulse required to change state of the register 202 may be predetermined and/or varied to meet the design criteria of a particular implementation. The register 202 may generate an output signal (e.g., EVENT) that may indicate that an event has occurred. The signal EVENT may be generated in response to a sufficiently large pulse presented to the input 204 and/or a subsequent read of the circuit 202. Therefore, a positive voltage transient on the power supply of sufficient magnitude (dV/dt) may be registered such that the system 200 may recognize that a transient has occurred.

Figure 5:
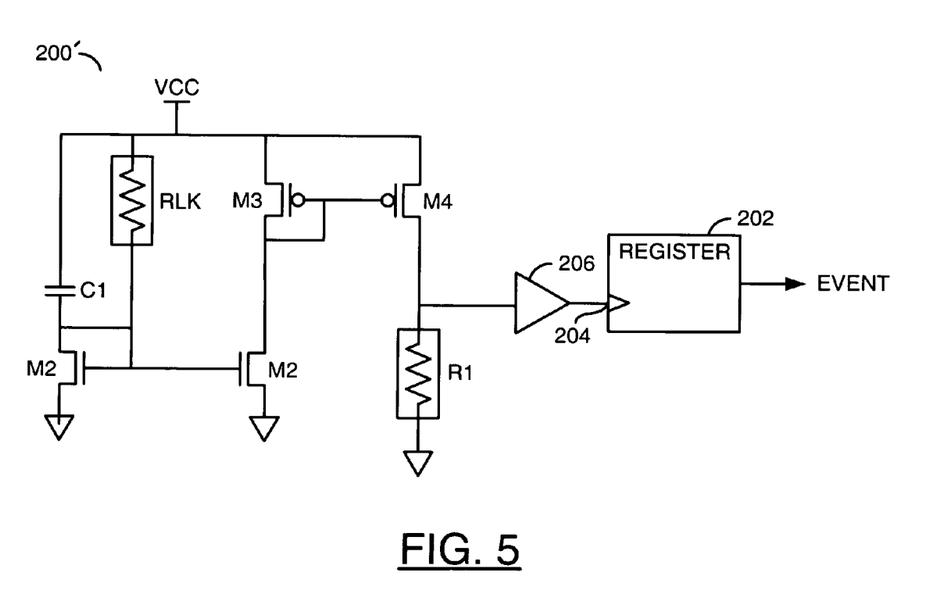
FIG. 5 is a block diagram of an alternate implementation of the circuit of FIG. 4.

Referring to FIG. 5, an alternate embodiment of the circuit 200 marked with primed notation is shown. The circuit 200' may be implemented similarly to the circuit 200. The circuit 200' additionally comprises a device (e.g., M3), a device (e.g., M4) and a device 206. The circuit 200' may be configured to provide increased current gain without loading the input stage of the circuit 202. The device M3 and the device M4 generally comprise a second stage of current mirrors. In addition, the output buffer 206 (which may be inverting if appropriate) may be added at the input 204 of the register 202.

Figure 6:
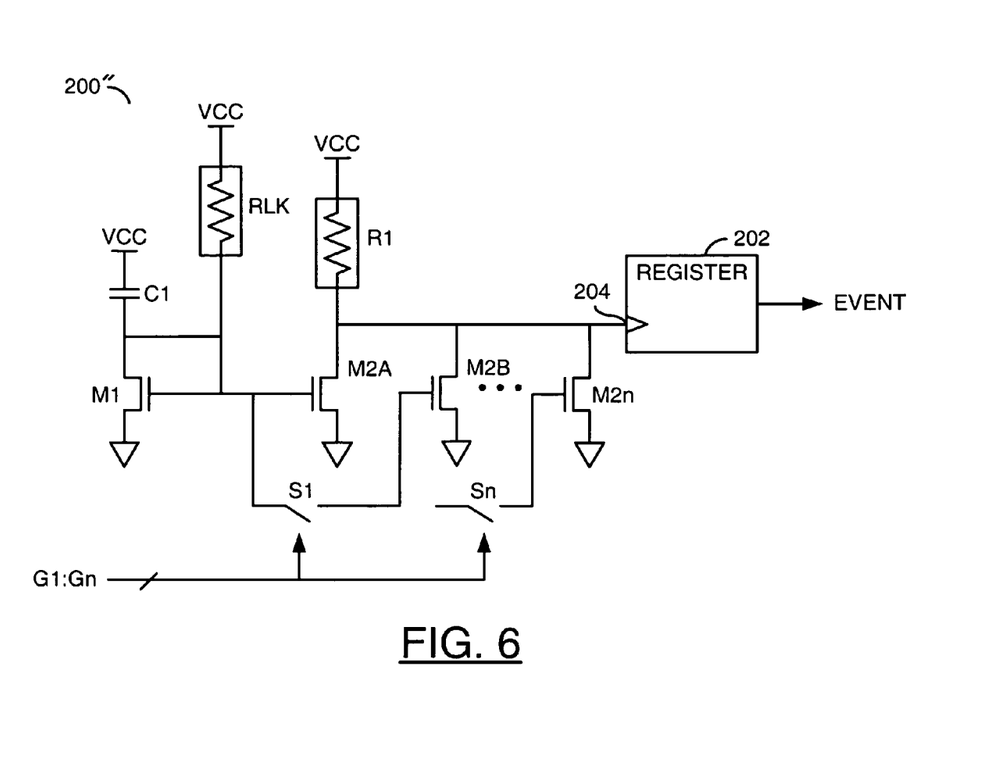
FIG. 6 is a block diagram of an alternate implementation of the circuit of FIG. 4.

Referring to FIG. 6, an alternate embodiment of the circuit 200 marked with double primed notation is shown. The circuit 200" may be implemented similarly to the circuit 200. The circuit 200" may be implemented as an example of a circuit configured to provide selectable sensitivity. The device M2 may be implemented as multiple devices M2a–M2n. The device M2a may be configured to be permanently connected and the additional devices M2b–M2n may be coupled to the current mirror via switches S1–Sn. The switches S1–Sn may be controlled in response to one or more control signals (e.g., G1–Gn). The circuit 200" may be configured to provide user adjustable control of the amount of sensitivity in the supply transient detector 152.

However, other alternative circuits for sensitivity trimming may be implemented to meet the design criteria of a particular application. Other example circuits that may be configured to provide sensitivity trimming include, but are not limited to, circuits that implement switches to vary the size of the capacitance (e.g., C1), vary the amount of the resistance (e.g., the resistors RLK, R1, etc.), vary the threshold voltage of the register 202 (e.g., the input 204), and/or vary the amount of leakage current that biases the device M1.

Figure 7:
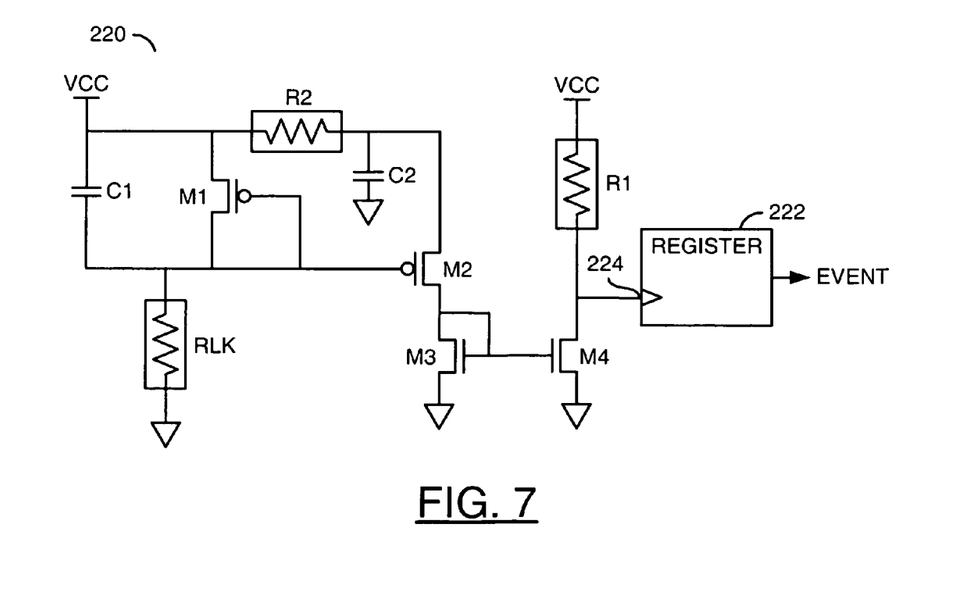
FIG. 7 is a block diagram of a negative supply transient detector implemented in connection with the present invention.

Referring to FIG. 7, a circuit 220 is shown illustrating a negative power supply transient detector. The circuit 220 may be configured to detect a negative power supply transient (e.g., when the voltage between the supply voltage and ground decreases) on a power supply and/or power supply rails. While sufficiently low supply voltage may be monitored and detected via a low-voltage reset circuit, such a circuit generally measures absolute voltage and not a transient voltage.

The circuit 220 generally comprises a capacitor (e.g., C1), a capacitor (e.g., C2), a resistor (e.g., R1), a resistor (e.g., R2), a resistor (e.g., RLK), a device (e.g., M1), a device (e.g., M2), a device (e.g., M3), a device (e.g., M4) and a register 222. The devices M1 and M2 may be implemented as PMOS devices. The devices M3 and M4 may be implemented as NMOS devices. However, the devices M1, M2, M3 and M4 may be implemented as any appropriate device to meet the design criteria of a particular application. The PMOS devices M1 and M2 may form a current mirror. The device R2 and the device C2 may form a low pass filter that may be configured to keep the supply voltage at a source of the device M2 relatively constant during transients. The devices M3 and M4 may be configured as a current mirror to mirror and possibly amplify the current from the device M2. The devices M3 and M4 may be configured to provide a voltage pulse to the resistive device R1.

When a negative supply transient occurs, the device C1 may pull the voltage on the gates of the devices M1 and M2 down. Because the source of the device M2 may stay relatively constant, more current may flow in the device M2. The device M1 may be configured primarily to bias the device M2 near the edge of turn-on. When a negative supply transient occurs, the current pulse of the device M2 may be mirrored and magnified in the current mirror M3/M4 to generate a pulse having a large enough transient to cause the register 222 to change state via input 224.

Figure 8:
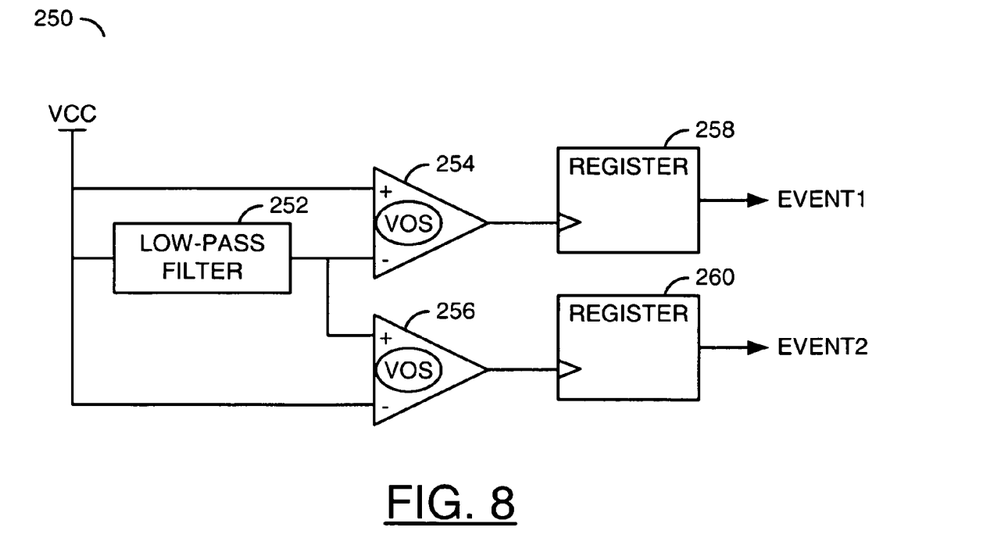
FIG. 8 is a block diagram of a supply transient detector implemented in connection with the present invention.

Referring to FIG. 8, a circuit 250 is shown illustrating a power supply transient detection circuit implementation via dual comparators. The dual-comparator circuit 250 may be configured to detect positive and/or negative transients on the power supply (and/or rails). The circuit 250 generally comprises a low pass filter 252, buffers 254 and 256 and registers 258 and 260. In one example, the low-pass filter 252 may be implemented as a simple resistor/capacitor circuit. However, the circuit 252 may be implemented as any appropriate low-pass filter to meet the design criteria of a particular application. The low pass filter 252 may be configured to provide a relatively constant supply voltage to a respective input of each of the comparators 254 and 256. The comparators 254 and 256 may be configured with a predetermined level of built-in offset. When the supply voltage (e.g., VCC) is constant and each comparator 254 and 256 has the same input voltage at respective inputs, the comparators 254 and 256 may be configured to switch states in response to the built-in offset. For example, the offset may be configured such that for the circuits 254 and 256 when the respective positive input (e.g., "+") appears to be lower in voltage than the negative input (e.g., "−") during a steady state condition of the circuit 250, the outputs of the circuits 254 and 256 may be at a digital low (e.g., off or 0).

For a positive voltage transient of sufficiently large amplitude (dV/dt), the "+" input may rise above the "−" input by an amplitude greater than the built-in offset, and the comparator 258 may be configured to trip and register an event (e.g., EVENT1). Similarly, for sufficiently large amplitude negative transitions from steady-state, the comparator 256 may be configured to trip and register an event (e.g., EVENT2). The comparators 254 and 256 may also be configured such that the amount of offset (e.g., sensitivity) may be selected (e.g., tuned, adjusted) by the user.

Figure 9:
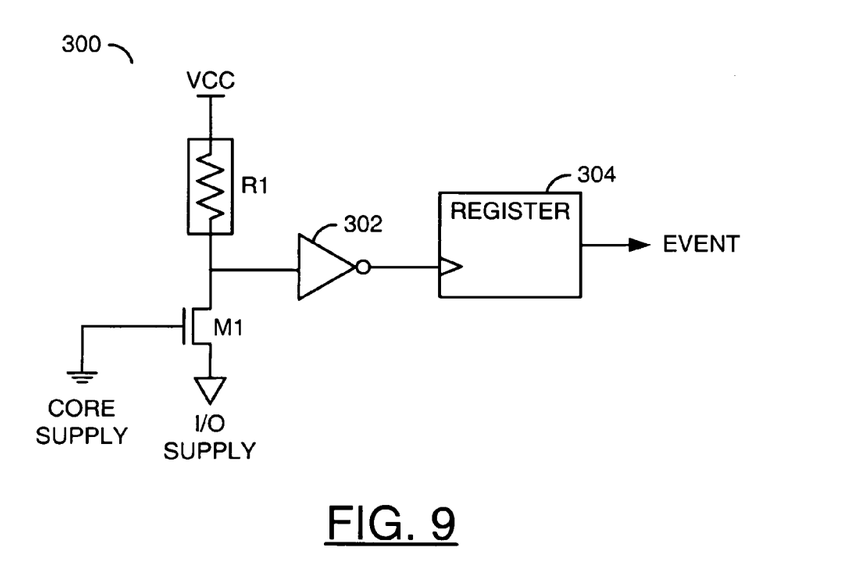
FIG. 9 is a block diagram of an output supply transient detector implemented in connection with the present invention.

Referring to FIG. 9, a circuit 300 configured to detect supply transients is shown. The circuit 300 may be configured to detect a difference in supply voltage between the I/O supply and the core supply. The circuit 300 generally comprises a device (e.g., R1), a device (e.g., M1), an inverter 302, and a register 304. The circuit 300 may be configured to provide transient detection between quiet and noisy supply lines. In many integrated circuit implementations, at least two lines are generally implemented for each supply (e.g., a quieter one used for the core of circuits and a noisier one used for the I/O to handle large transient I/O currents). Therefore, disturbance events may cause the quiet and noisy lines to differ in voltage. In one example, the difference in voltage may be in response to large transient currents flowing on the I/O supply line.

In one example, relatively low differences between the I/O and core line voltage may be generated in response to I/O switching. However, the circuit 300 may be configured to detect abnormally large transient differences between the quiet and noisy lines. The NMOS device M1 may turn on and pass current in response to a large negative transition on the I/O supply ground (relative to the core supply ground). A voltage drop (e.g., a negative pulse) may then be generated across the pull-up device R1. The device R1 may be implemented as a resistor, transistor, or other appropriate device. At sufficiently large currents, the resulting negative voltage pulse may trip the logic threshold on the input buffer 302 and the event (e.g., the negative transition on the I/O lines) may be registered by the register 304. In another example, a similar circuit using a PMOS device may be implemented between the core and I/O supply of a positive voltage (e.g., VCC).

While the circuits of FIGS. 4–9 may be representative of typical detector circuit 152 implementations, detailed changes may be made without parting from the overall teaching of the present invention. For example, different transistor types may be substituted, the number of stages of gain may be varied, and/or the input polarities may be reversed.

The system 100 may be configured to detect over-stress. The present invention may increase the robustness of device operation. The system 100 may be configured to either directly reset a device in response to overstress events, and/or to self-monitor and take appropriate recovery action when overstress events occur. The present invention may also be applicable to state-machine (or any appropriate monitor/control circuitry) implementations in addition to the microcontroller implementations 150 and 150' to meet the design criteria of a particular application.

The system 100 may provide flexibility in response to stress conditions. In one example application of a device, the present invention may be configured to provide a quick and complete reset in response to one or more stress events. In another example, the present invention may be configured to implement self checking, issue warnings, perform back-up operations, shut-down, and/or other appropriate recovery steps prior to or instead of a full reset in response to one or more overstress events. Since the events may be registered and may be monitored, the present invention may be configured to provide a number of recovery actions at one or more predetermined subsequent times in response to one or more overstress events. In one example, a mouse user might want to reset completely and start over in response to an overstress event. In another example, a keyboard user may flush keyboard buffers, reload default state values, and then continue in response to an overstress event. In another example, integrity of previous data writes to external flash memory may be checked in response to one or more overstress events.

The system 100 may be implemented having detection capability such that a device may be configured to perform any appropriate action when stress events are occurring, even when failure does not result in response to the stress events. For example, an event might be an indication that environmentally harsh conditions are beginning. In response, the system 100 may initiate an immediate back-up operation.

The system 100 may be configured to provide high bandwidth detection of power supply transients while consuming very low power (e.g., the detection devices are generally biased at or near leakage thresholds). The system 100 may be configured to consume a small overall supply current (e.g., on the order of 1 microamp). The system 100 may be configured to provide detection level tunability. Each particular application of the system 100 may be tuned to provide the desired overstress protection level via changing (adjusting, tuning) the detector 152 (or state 102) sensitivity.

The system 100 may be configured to detect and store power line transient stress event occurrences. The system 100 may be configured to detect and store power line transients (positive and/or negative). The system 100 may be configured to provide trimable detection sensitivity on a device-by-device basis. The system 100 may be implemented having a microcontroller (or other appropriate circuitry) with the capability to monitor stress events and implement appropriate action.

While the invention has been particularly shown and described with reference to the preferred embodiments thereof, it will be understood by those skilled in the art that various changes in form and details may be made without departing from the spirit and scope of the invention.

The invention claimed is:

1. A method for recovery from transient conditions, comprising the steps of:
   (A) detecting a transient voltage event on one or more power lines with a supply line transient detection circuit comprising (i) a capacitor and a resistor connected to said one or more power lines, (ii) a current mirror coupled to said capacitor and said resistor and (iii) a register connected to said current mirror, wherein said one or more power lines power a microcontroller;
   (B) storing an occurrence of said transient voltage event in said register; and
   (C) taking appropriate recovery action when said stored occurrence of said transient voltage event is a first non-critical predetermined type and resetting a device when said transient voltage event is a second critical predetermined type.

2. The method according to claim 1, wherein step (C) comprises taking said appropriate recovery action at a later time.

3. The method according to claim 1, wherein step (B) further comprises:
   registering said occurrence of said transient voltage event.

4. The method according to claim 1, wherein the detecting in step (A) comprises detecting one or more transient overstress events.

5. The method according to claim 1, wherein said transient voltage event comprises large transient voltages on said power lines.

6. The method according to claim 1, wherein said transient voltage event comprises a power supply transient.

7. The method according to claim 1, wherein said stored transient voltage event is monitored via said microcontroller.

8. The method according to claim 1, wherein step (C) further comprises:
   recognizing a type of said transient voltage event.

9. The method according to claim 1, wherein a sensitivity of said detecting is adjusted.

10. The method according to claim 1, further comprising the steps of:
    (D) repeating steps (A)–(C).

11. The method according to claim 1, wherein said appropriate recovery action occurs prior to a full reset.

12. The method according to claim 1, wherein said appropriate recovery action occurs in place of a full reset.

13. The method according to claim 1, wherein said appropriate recovery action is implemented in firmware.

14. The method according to claim 1, wherein said step (A) comprises continuously monitoring said one or more power lines.

15. The method according to claim 1, wherein said recovery action comprises a self checking operation.

16. The method according to claim 1, wherein said recovery action comprises a back up operation.

17. An apparatus comprising:
    means for detecting a transient voltage event on one or more power lines using a supply line transient detection circuit comprising (i) a capacitor and a resistor connected to said one or more power lines, (ii) a current mirror coupled to said capacitor and said resistor and (iii) a register connected to said current mirror, wherein said power lines power a microcontroller;
    means for storing an occurrence of said transient voltage event; and
    means for taking appropriate recovery action when said stored occurrence of said transient event is a first non-critical predetermined type and resetting a device when said transient voltage event is a second critical predetermined type.

18. The apparatus according to claim 17, wherein said appropriate recovery action occurs prior to a full reset.

19. The apparatus according to claim 17, wherein said appropriate recovery action occurs in place of a full reset.

20. The apparatus according to claim 17, wherein said appropriate recovery action is implemented in firmware.

21. An apparatus comprising:
    a supply line transient detection circuit comprising (i) a capacitor and a resistor connected to one or more power lines, (ii) a current mirror coupled to said capacitor and said resistor and (iii) a register connected to said current mirror and (ii) configured to detect an occurrence of a transient voltage event on said one or more power lines, wherein said one or more power lines power a microcontroller; and
    said register configured to store said occurrence, wherein said apparatus is configured to take appropriate recovery action when said stored occurrence of said transient voltage event is a first non-critical predetermined type and resetting a device when said transient voltage event is a second critical predetermined type.

22. The apparatus according to claim 21, wherein a sensitivity of said detection circuit is adjustable.

23. The apparatus according to claim 21, wherein said apparatus is further configured to take said appropriate recovery action at a later time.

24. The apparatus according to claim 21, wherein said apparatus is further configured to recognize a type of said transient voltage event.

25. The apparatus according to claim 21, wherein said apparatus comprises a peripheral device.

26. The apparatus according to claim 21, wherein said appropriate recovery action occurs prior to a full reset.

27. The apparatus according to claim 21, wherein said appropriate recovery action occurs in place of a full reset.

28. The apparatus according to claim 21, wherein said appropriate recovery action is implemented in firmware.

29. A method for recovery from transient conditions, comprising the steps of:
    (A) detecting a transient voltage event on one or more power lines with a supply line transient detection circuit comprising (i) a capacitor and a resistor connected to said one or more power lines, (ii) a current mirror coupled to said capacitor and said resistor and (iii) a register connected to said current mirror, wherein said one or more power lines power a microcontroller;
    (B) storing an occurrence of said transient voltage event in said register; and
    (C) taking appropriate recovery action when said stored occurrence of said transient voltage event is a first predetermined type and resetting a device when said transient voltage event is a second predetermined type, wherein said recovery action is implemented to avoid a re-boot of said microcontroller.

* * * * *